United States Patent
Frost et al.

(10) Patent No.: US 9,772,179 B2
(45) Date of Patent: Sep. 26, 2017

(54) CHAIN WEAR MONITORING DEVICE

(71) Applicants: Charles C. Frost, Ada, MI (US);
James A. Mitchell, Grand Rapids, MI (US)

(72) Inventors: Charles C. Frost, Ada, MI (US);
James A. Mitchell, Grand Rapids, MI (US)

(73) Assignee: Frost Tech LLC, Grand Rapids, MI (US)

( * ) Notice: Subject to any disclaimer, the term of this patent is extended or adjusted under 35 U.S.C. 154(b) by 492 days.

(21) Appl. No.: 14/326,814

(22) Filed: Jul. 9, 2014

(65) Prior Publication Data
US 2016/0010977 A1 Jan. 14, 2016

(51) Int. Cl.
*G01B 11/14* (2006.01)
*G01B 21/16* (2006.01)

(52) U.S. Cl.
CPC .............. *G01B 11/14* (2013.01); *G01B 21/16* (2013.01)

(58) Field of Classification Search
CPC ....... F16H 57/01; G01B 21/16; G01B 11/043; G01M 13/023; B62J 2099/002
See application file for complete search history.

(56) References Cited

U.S. PATENT DOCUMENTS

| 4,274,783 A | 6/1981 | Eineichner et al. |
| 4,566,339 A | 1/1986 | Davidson et al. |

(Continued)

FOREIGN PATENT DOCUMENTS

| DE | 19713560 | 12/1998 |
| EP | 1508277 | 2/2005 |

(Continued)

*Primary Examiner* — Matthew G Marini
(74) *Attorney, Agent, or Firm* — Mitchell Intellectual Property Law, PLLC

(57) ABSTRACT

A conveyor or drive chain wear monitor includes two sensors spaced apart from one another a predetermined distance which is less than the distance between the adjacent measuring points on a chain. Two timers are provided, one of which is a chain speed timer and the other of which is the chain wear timer. The two timers are both controlled by the spaced sensors. The upstream sensor, as determined by the direction of travel of the chain, turns the speed timer on and the wear timer off. The downstream sensor turns the speed timer off and the wear timer on. Thus, when a measuring point passes the upstream sensor, the speed timer is turned on, and is not turned off again until the same measuring point passes the downstream timer. Knowing the distance between the upstream and downstream sensors, the computing module determines the speed at which the chain is moving as a function of the length of time, as determined by the speed timer, it took a measuring point on the chain to pass from the upstream sensor to the downstream sensor. When a measuring point passes the downstream sensor, it turns on the wear timer. The wear timer then remains on until a measuring point on the chain passes the upstream sensor. The wear timer will thus be turned on by a downstream measuring point, and turned off by the following upstream measuring point. Knowing the speed of the chain, the computing module can now determine the degree of wear on the chain as a function of the speed of the chain and the wear time which the wear timer is on, as compared to the baseline value for the same function when the chain is new.

28 Claims, 2 Drawing Sheets

(56) References Cited

U.S. PATENT DOCUMENTS

| | | | |
|---|---|---|---|
| 4,803,886 A | 2/1989 | May et al. | |
| 5,272,924 A | 12/1993 | Tassic et al. | |
| 5,291,131 A | 3/1994 | Suzuki et al. | |
| 5,563,392 A | 10/1996 | Brown et al. | |
| 5,689,067 A | 11/1997 | Klein et al. | |
| 5,957,263 A * | 9/1999 | Espenschied | G01B 21/06 198/349.95 |
| 5,997,423 A * | 12/1999 | Kwon | B65G 23/44 198/810.04 |
| 6,851,546 B2 | 2/2005 | Lodge | |
| 6,862,939 B2 | 3/2005 | Frost | |
| 6,993,978 B2 | 2/2006 | Frost | |
| 7,325,669 B2 | 2/2008 | Frost et al. | |
| 7,540,374 B2 | 6/2009 | Rathbun et al. | |
| 2003/0140709 A1 | 7/2003 | Frost | |
| 2004/0226805 A1* | 11/2004 | Lodge | G01B 7/046 198/810.02 |
| 2004/0237662 A1 | 12/2004 | Nassar et al. | |
| 2007/0114110 A1 | 5/2007 | Frost et al. | |
| 2008/0047804 A1 | 2/2008 | Rathbun et al. | |
| 2011/0093218 A1* | 4/2011 | Vozner | G01B 11/028 702/34 |

FOREIGN PATENT DOCUMENTS

| | | |
|---|---|---|
| GB | 1418376 | 12/1975 |
| GB | 2406844 | 4/2005 |
| JP | 61163220 | 10/1986 |
| JP | 62145105 | 6/1987 |
| JP | 63306116 | 12/1988 |
| JP | 2130402 | 5/1990 |
| JP | 2006317359 | 11/2006 |
| KR | 1020090055591 | 6/2009 |
| SU | 1063739 | 12/1983 |
| WO | 03093783 | 11/2003 |
| WO | 2008024685 | 2/2008 |

\* cited by examiner

CHAIN WEAR MONITORING DEVICE

FIELD AND BACKGROUND OF THE INVENTION

The present invention relates to chain wear monitoring devices. Such devices are designed to determine the extent of wear on a chain while it is moving. Such devices are used for example to monitor wear on moving chains used in overhead conveyors. Such chains wear at the junction between the links of the chain, and often occur at the pins which are used to join adjacent links of the chain.

SUMMARY OF THE INVENTION

In the chain wear monitor of the present invention, two sensors are provided for sensing predetermined spaced points on the chain. The two sensors are spaced apart from one another a predetermined distance which is less than the distance between the adjacent measuring points on the chain. Two timers are provided, one of which is a chain speed timer and the other of which is the chain wear timer. The two timers are both controlled by the spaced sensors. The upstream sensor, as determined by the direction of travel of the chain, turns the speed timer on and the wear timer off. The downstream sensor turns the speed timer off and the wear timer on. Thus, when a measuring point passes the upstream sensor, the speed timer is turned on, and is not turned off again until the same measuring point passes the downstream timer. Knowing the distance between the upstream and downstream sensors, the computing module determines the speed at which the chain is moving as a function of the length of time, as determined by the speed timer, it takes a measuring point on the chain to pass from the upstream sensor to the downstream sensor. When a measuring point passes the downstream sensor, it turns on the wear timer. The wear timer then remains on until a measuring point on the chain passes the upstream sensor. The wear timer will thus be turned on by a downstream measuring point, and turned off by the following upstream measuring point. Knowing the speed of the chain, the computing module can now determine the degree of wear on the chain as a function of the speed of the chain and the wear time which the wear timer is on, as compared to the baseline value for the same function when the chain is new.

These and other features, objects and advantages of the invention will be more fully understood and appreciated by reference to the written specification and appended drawings.

DETAILED DESCRIPTION OF THE PREFERRED EMBODIMENT

Figure 1:
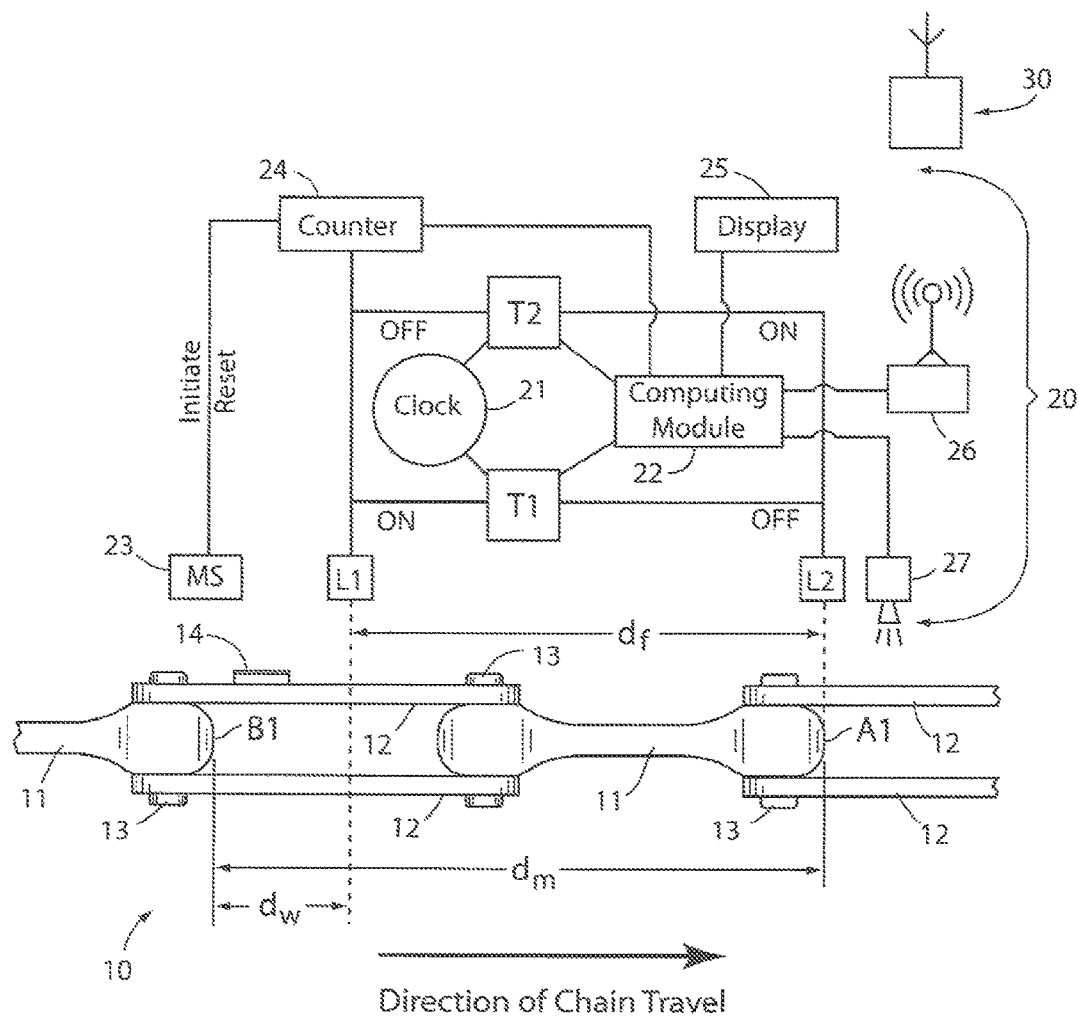
FIG. 1 shows conveyor chain as it passes a preferred embodiment wear monitor.

FIG. 1 shows a typical conveyor chain 10 as it moves passed the wear monitoring device 20 towards the right as shown in FIG. 1. Spaced center links 11 are joined to side links 12 by pins 13. In the embodiment shown, the leading edge of each center link 11 has been chosen as a measuring point. As shown, measuring point A1 would be the downstream measuring point relative to measuring point B1.

The wear monitor comprises an upstream sensor L1 and a downstream sensor L2. Sensors L1 and L2 are positioned a fixed distance $d_f$ apart. The distance $d_f$ must be a shorter distance than the "new chain" distance $d_{m-i}$ between successive measuring points on chain 10. These sensors are connected to a speed timer T1 and a wear timer T2, both of which are connected to a clock 21 and a computing module 22. The speed timer T1 and wear timer T2 include on and off triggers which are operated by signals received from the upstream and downstream sensors L1 and L2. The timers determine the passage of time through their connection to clock 21. Computing module 22 records the time which passes and uses that information to determine speed and wear.

Specifically, speed timer T1 is turned on every time upstream sensor L1 senses the passage of a measuring point, e.g. A1, B1 etc. At the same time, upstream sensor L1 turns off the wear timer T2. Thus when any measuring point on the chain passes sensor L1, the speed timer T1 is turned on and the wear timer T2 is turned off.

The downstream sensor L2 turns the speed timer T1 of every time it senses the passage of a measuring point, A1, B1, etc. On the other hand, downstream sensor L2 turns wear timer T2 on every time a measuring point passes it. Thus, when upstream sensor L1 senses the passage of a measuring point, speed timer T1 is turned on, and is not turned off again until that same measuring point passes downstream sensor L2. Knowing the fixed distance $d_f$ between upstream and downstream sensors L1 and L2, and the speed time $t_1$ which timer T1 was on computing module 22 can calculate the speed at which chain 10 is moving:

$$\text{Speed } S = \frac{\text{fixed distance } d_f}{\text{speed time } t_1 \text{ as determined by } T1}$$

Thus as shown in FIG. 1, speed of chain 10 is being determined based on the time $t_1$ it took measuring point A1 to get from sensor L1 to sensor L2.

As measuring point A1 passes sensor L2, wear timer T2 is turned on, at the same time speed timer T1 is turned off. Timer T2 will not turn off until the successive measuring point B1 passes sensor L1. Computing module 22 can determine the degree of wear on the chain as a function of the speed S of the chain and the wear time $t_2$ which timer T2 is on, as compared to the baseline value for the same function when the chain is new. This can be accomplished in at least two different ways.

One formula compares the distance $d_m$ as measured currently to the initial distance $d_{m-i}$ between the two measuring points, referred to as the "baseline value." Using the speed S of the chain and the wear time $t_2$ as determined by wear timer T2, computing module 22 can determine the distance $d_m$ between the two successive measuring points A1 and B1 as follows:

$$d_m = (S \cdot t_2) + d_f$$

Since computer 22 has either determined or been programmed to know what the initial distance $d_{m-I}$ (the baseline value in this equation) was when chain 10 was new, computer 22 can determine the degree of wear by subtracting $d_{m-i}$ from $d_m$:

$$\text{Wear } W = d_m - d_{m-i}$$

Computing module 22 is programmed such that an operator can enter the distance between successive measuring points A1, B1, etc. when the chain is new ($d_{m-i}$). The initial distance $d_{m-i}$ input into computing module 22 can be based on operator input of the "as manufactured" distance between said wear points. Preferably, however, the input indicating the initial distance between each successive pair of measuring points is determined and recorded in computing module 22 as a result of the measurements taken by wear monitor 20 during the first pass of chain 10 passed wear monitor 20. The operator thus has saved in computer 22 a precise measurement of the initial distance $d_{m-i}$ between each adjacent pair of measuring points on chain 10. This eliminates error caused by manufacturing variability, and makes the wear measurement ultimately taken more accurate. Indeed, it gives an accurate measurement of $d_{m-i}$ for each link set in the chain.

Figure 2:
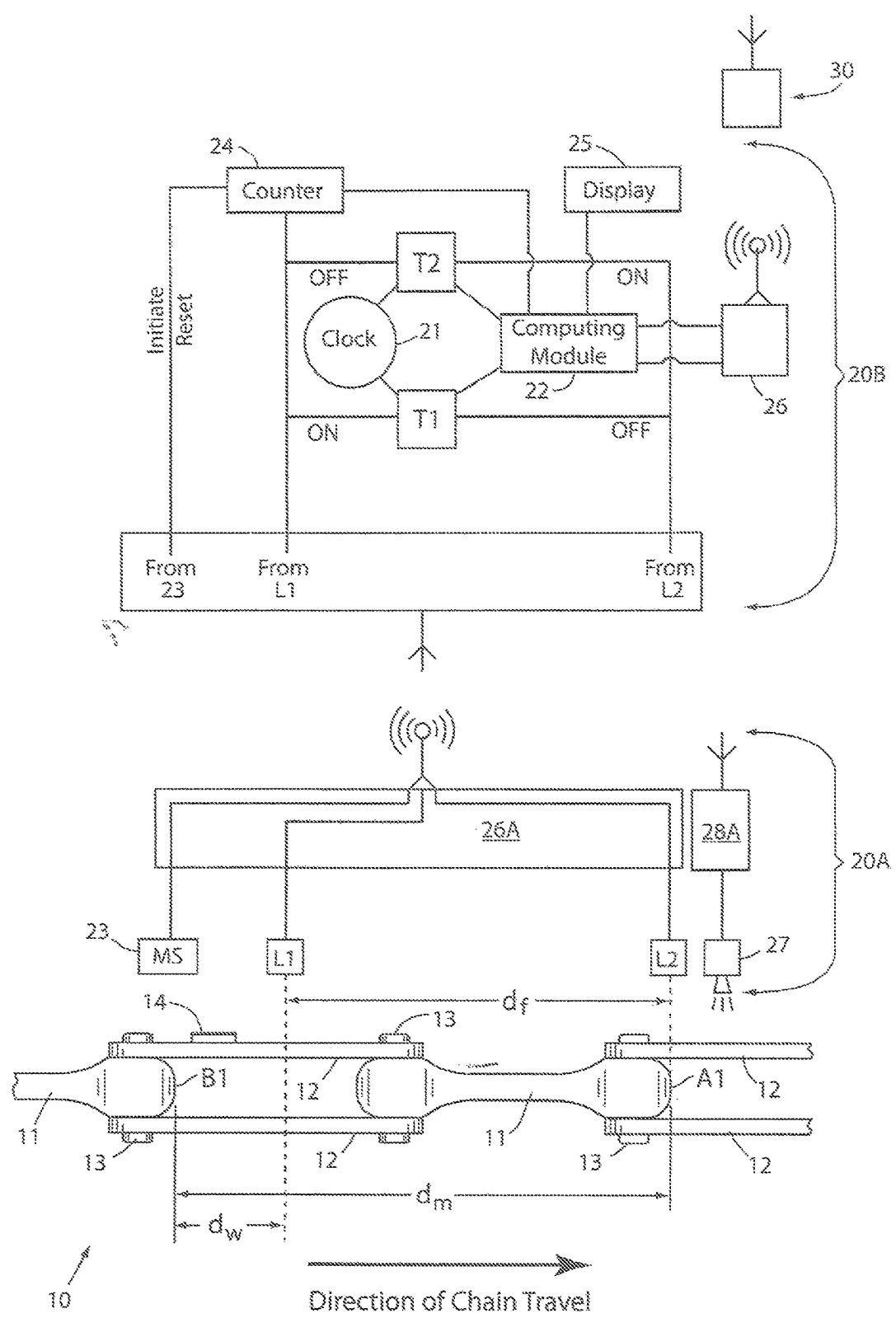
FIG. 2 discloses an alternative embodiment in which wear monitor 20 is divided into a sensor unit 20A and a computing module unit 20B.

In a second formula, the computing module can be programmed to determine only the distance $d_w$ travelled by the chain during the time $t_2$ during which wear timer T2 is on. The distance $d_w$ is referred to for convenience as the "wear distance," it is used to determine chain wear. As seen in FIGS. 1 and 2, the wear distance is the distance $d_m$ between adjacent measuring points on chain 10, less the distance $d_f$ between upstream and downstream sensors L1 and L2:

$$d_w = d_m - d_f$$

Said another way, wear distance is the distance travelled by the chain between the time a measuring point A1 on chain 10 turns timer T2 on, until the subsequent measuring point B1 turns timer T2 off. Wear can be determined by comparing the initial distance $d_{w-i}$ (the baseline value in this equation) for a new chain to the $d_w$ measured on any subsequent pass of the chain past wear monitor 20, as follows:

$$d_w = (S \cdot t_2)$$

$$d_{w-i} = (S \cdot t_2) \text{ for a new chain.}$$

$$\text{Wear } W = d_w - d_{w-i}$$

As above, the initial wear distance $d_{w-i}$ (the baseline value), can be programmed into computing module 22 using "as manufactured" data, or can be determined on the first pass of a new chain past wear monitor 20.

The accuracy of the speed and wear determinations made by wear monitor 20 is in part a function of the distance between the upstream sensor L1 and the downstream sensor L2. As noted above, the sensors need to be spaced a distance which is less than the distance between adjacent measuring points A1 and B1 on chain 10. Within those confines, the accuracy of the speed determination is enhanced by spacing the sensors as tar apart as possible, and the accuracy of the wear determination is enhanced by spacing the sensors as close together as possible. As a starting point, the distance between sensors L1 and L2 must be such that reasonably accurate speed and wear measurements can be obtained. Preferably, one of the sensors is moveably mounted relative to the other such that the sensors can be spaced at a distance equal to about half to three quarters of the space between adjacent measuring points on chain 10, most preferably about half. Preferably, each measuring point is associated with a single link set, such that the spacing $d_f$ is equal to about half to three quarters of the nominal pitch of the chain 10 being monitored, most preferably, about half. In the alternative, fixedly mounted sensors can be spaced at a distance equal to about half to three quarters of the nominal pitch of the smallest pitch chain 10 to be monitored, most preferably, about three quarters.

In the preferred embodiment, chain 10 is provided with a location marker 14, positioned between a pair of adjacent measuring points. Wear monitor 20 includes a location marker sensor 23 which initiates or resets a counter 24. Counter 24 is also connected to upstream sensor L1 and to computing module 22. Downstream sensor L2 could also be used, but upstream sensor L1 is preferred. When wear monitor 20 is first turned on, counter 24 is idle until such time as marker sensor 23 senses location marker 14. Location marker 14 is not sensed by either upstream or downstream sensors L1 and L2. It is only sensed by marker sensor 23. When location marker is sensed by marker sensor 23, counter 24 is initiated, or if it has already been running, is reset to 0. When thereafter upstream sensor L1 senses a measurement point, counter 24 counts the sensing. Preferably, marker sensor 23 is located within one link set of upstream sensor L1, so that computing module 22 would be recording the first link set after location marker 14 as link set number 1. Subsequent link sets would be number 2, 3, 4, seriatim, until marker 14 passes marker sensor 23 again, resulting in a re-set of counter 24. The computing module will keep track of wear data for each numbered link set, for each successive pass by wear monitor 20. Of course, the display of the recorded information is preferably adjustable as a function of wear rate, such that one could show the wear data at spaced passage intervals, e.g. every ten passes or every 25 passes, etc.

Preferably, measuring points are selected so that there is one measuring point for each "link set." In some types of chains, a link set may be a single link. In the conveyor chain 10 shown in the preferred embodiment, a link set comprises one center link 11 and a pair of side links 12 connected by pin 13. Computing module 22 correlates link set count with the degree of wear shown for that link set on that pass. This information is recorded by the computing module 22. In this way, an operator can determine the wear at each link set on any given pass by the wear monitor.

Each time marker sensor 23 resets counter 24, it also triggers computing module 22 to start recording a subsequent series of wear monitor measurements for each subsequent pass of the link sets passing wear monitor 20. In this way, computing module 22 retains a record of measurements for each link set for each complete revolution of chain 10 past wear monitor 20. Computing module 22 is also preferably hard wired or programmed to generate a graph showing the rate of increase of wear for each numbered link set over time.

Preferably, marker sensor 23 would be a different type of sensor from upstream and downstream measuring sensors L1 and L2. This would avoid any possibility of either of the measuring sensors L1 or L2 mistakenly sensing location marker 14 as a passing measuring point A1, B1, etc. In a preferred embodiment, marker 14 is a magnet, and marker sensor location marker sensor 23 is a magnetic sensor. On the other hand, measuring sensors L1 and 12 are preferably laser sensors, which sense the passing measuring points by having its laser beam broken between the laser sensor and a beam receiver.

In the preferred embodiment shown, the measuring points A1, B1, etc. constitute the leading edge of each center link 11. Other measuring points could be selected, but preferably the measuring points are selected such that each measuring point is unique to a single link set. The measuring points could comprise projections extending upwardly (or downwardly) from the top or bottom of the link pins 13. In keeping with the concept of each measuring point representing a single link set, such projections would be placed on every other link pin 13 of chain 10, since a link set comprises two links, namely a center link 11 and a pair of side links 12. Such projections are disclosed in U.S. Pat. No. 6,862,939.

Wear monitor 20 preferably includes an internal display 25 connected to computing module 22. Computing module 22 can be programmed to display different types of information. Thus computing module 22 could display the instantaneous speed and wear measurements being taken for each link set. It could display a running average for speed and wear. It could display a graph showing the rate of increase in wear of any given link set. Computing module 22 could be programmed to display and/or sound an alarm when chain wear at any point in chain 10 becomes excessive. Similarly, computing module 22 could be connected to a painter 27 which would paint a passing link set which had shown too much wear. On the other hand, by actually numbering the link sets in chain 10, beginning with number 1 for the link set immediately following location marker 14, one could readily find the over worn link set, since it would also be identified by computing module 22 in accordance with its link set number.

Preferably, monitor 20 includes not only an internal display, but also includes a transmitter 26 which will transmit display information to a printer or to an external computer or computer display 30. In this way, an operator could locate himself anyplace relative to chain 10, or move about while observing the operation of chain 10, and still view pertinent information on his computer/display 30. Transmitter 26 can also transmit instructions to a printer, to print out the results of the computing module's analysis of the chain wear.

FIG. 2 discloses an alternative embodiment in which wear monitor 20 is divided into two separate units: a sensor unit 20A and a controller unit 20B. Sensor unit 20A preferably comprises marker sensor 23, and measuring sensors L1 and L2, all coupled to a transmitter 26A, and a painter 27 connected to a receiver 28A. All of the remaining functions shown in FIG. 1 are preferably contained in controller 20B, which would include a receiver 28 for receiving the transmission from transmitter 26A, and a transmitter 26 for transmitting a "paint" signal to receiver 28A. That signal would then activate painter 27 to paint the defective link. The transmitter 26A would assign a unique frequency or frequency variation to each sensor, so the controller 20B will recognize which sensor it is receiving a signal from. Similarly, transmitter 26A uses a unique frequency or frequency variation for the paint signal.

In this embodiment, controller 20B can be either a dedicated hard wired unit, or it can be a personal computer device of any kind, programmed with a software application containing the timer circuits T1 and T2, the clock function 21, the computing module 22, the counter 24 and the display controller 25 which would simply operate the display on the personal computer device.

Transmitter 26A would also be used to transmit computer information to a printer or to another person's personal computer device 30. The term "personal computer device" as used herein refers to any type of computer including a receiver and preferably a transmitter for receiving and transmitting information. It could be a laptop computer, a desktop computer, a handheld computer telephonic device, etc. In all cases where a transmitter and a receiver are called for in a single unit, a transmitter/receiver unit could be used to accomplish both functions.

Of course, it is understood that the above are merely preferred embodiments of the invention and that various changes and alterations can be made without departing from the spirit and broader aspects of the invention, as set forth in the appended claims, as interpreted in accordance with the doctrine of equivalents.

The invention claimed is:

1. A chain wear monitor comprising:
    two sensors for sensing predetermined spaced measuring points on a chain, said two sensors being spaced apart from one another a predetermined distance which is less than a distance between adjacent ones of said spaced measuring points on said chain;
    one of said sensors being the upstream sensor, as determined by the direction of travel of the chain, and the other of said sensors being the downstream sensor;
    two timers, one of which is a chain speed timer and the other of which is the chain wear timer, both said timers being controlled by said spaced sensors;
    said upstream sensor acting to turn said chain speed timer on and said wear timer off when sensing the passage of one of said measuring points on said chain;
    said downstream sensor acting to turn said speed timer off and said wear timer on when it senses the passage of one of said measuring points on said chain;
    a computing module which determines the speed at which the chain is moving as a function of the length of time, as determined by said speed timer, it takes a measuring point on the chain to pass from said upstream sensor to said downstream sensor;
    said computing module determining the degree of wear on said chain as a function of the speed of the chain and the wear time which said wear timer is on, as compared to the baseline value for the same function when the chain is new.

2. The chain wear monitor of claim 1 in which said sensors are spaced at a distance equal to about half to three quarters of the distance between adjacent measuring points on chain.

3. The chain wear monitor of claim 1 in which said sensors are spaced at a distance equal to about half of the distance between adjacent measuring points on chain.

4. The chain wear monitor of claim 1 in which at least one of said sensors is moveably mounted, such that the spacing of said sensors can be adjustably located according to the spacing between adjacent measuring points on any given chain.

5. The chain wear monitor of claim 1 in which said sensors sense a measuring point associated with each link set of said chain, and at least one of said sensors can be adjustably located such that the distance between them is equal to about half to three quarters of the nominal pitch of the chain being monitored.

6. The chain wear monitor of claim 1 in which said sensors sense a measuring point associated with each link set of said chain, and are spaced at a distance equal to about half to three quarters of the nominal pitch of the smallest pitch chain to be monitored.

7. The chain wear monitor of claim 6 in which said sensors are spaced at a distance equal to about three quarters of the nominal pitch of the smallest pitch chain to be monitored.

8. The chain wear monitor of claim 1 which includes a location marker sensor for sensing a location marker on said chain; said wear monitor initiating or resetting a counter when said location marker is sensed; said counter also being connected to one of said upstream or downstream sensors, such that said counter counts and identifies the location of each said measuring point on said chain, relative to said marker, as it passes its said upstream or downstream sensor.

9. The chain wear monitor of claim 8 in which said wear monitor correlates the link set count as determined by said counter, with the degree of wear shown for that link set on that pass.

10. The chain wear monitor of claim 9 in which each time said marker sensor resets said counter, it also causes said wear monitor to start recording a subsequent series of wear monitor measurements for each subsequent pass of said link sets passing said wear monitor.

11. The chain wear monitor of claim 10 in which said wear monitor also generates a graph showing the rate of increase of wear for each numbered link set over time.

12. The chain wear monitor of claim 8 in which said marker sensor is a different type of sensor from said upstream and downstream measuring sensors.

13. The chain wear monitor of claim 1 which comprises a display which is capable of displaying one or more of the following: the instantaneous speed and wear measurements being taken for each link set of said chain, a running average for speed and wear, a graph showing the rate of increase in wear of any given link set.

14. The chain wear monitor of claim 13 which also includes a transmitter which will transmit display information to a printer or to an external computer or computer display.

15. The chain wear monitor of claim 1 in which said wear monitor is divided into two separate units: a sensor unit and a controller unit; said sensor unit comprising said upstream and downstream measuring sensors, coupled to a transmitter; said controller unit including said timers, said computing unit, and a signal receiver for receiving signals from said upstream and downstream measuring sensors and forwarding said signals to said timers.

16. The chain wear monitor of claim 15 in which said controller unit comprises a computer programmed to perform the functions of said timers and said computing module.

17. The chain wear monitor of claim 15 in which said transmitter assigns a unique frequency or frequency variation to each said measurement sensor, so said controller recognizes which sensor it is receiving a signal from.

18. The chain wear monitor of claim 15 in which said controller unit includes a counter, and said sensor unit also includes said marker sensor, said marker sensor being connected to said transmitter to transmit a signal from said marker sensor to said computing unit in said controller.

19. The chain wear monitor of claim 18 in which said sensor unit includes a painter, and a receiver associated with said painter; said controller being equipped with a transmitter which will transmit a paint signal to said painter receiver, where a particular link is indicated as having excess wear, said signal activating said painter to paint said defective link.

20. A method of monitoring wear in a moving chain comprising: selecting spaced measuring points on said chain; passing said chain past a chain wear monitor comprising:

two sensors for sensing said predetermined spaced measuring points on said chain, said two sensors being spaced apart from one another a predetermined distance which is less than a distance between adjacent ones of said spaced measuring points on said chain;

one of said sensors being the upstream sensor, as determined by the direction of travel of the chain, and the other of said sensors being the downstream sensor;

two timers, one of which is a chain speed timer and the other of which is the chain wear timer, both said timers being controlled by said spaced sensors;

said upstream sensor acting to turn said chain speed timer on and said wear timer off when sensing the passage of one of said measuring points on said chain;

said downstream sensor acting to turn said speed timer off and said wear timer on when it senses the passage of one of said measuring points on said chain;

a computing module which determines the speed at which the chain is moving as a function of the length of time, as determined by said speed timer, it takes a measuring point on the chain to pass from said upstream sensor to said downstream sensor;

said computing module determining the degree of wear on said chain as a function of the speed of the chain and the wear time which said wear timer is on, as compared to the baseline value for the same function when the chain is new.

21. The method of claim 20 in which wear is determined by comparing the distance $d_m$ between two adjacent measuring points, as determined currently, to an initial distance $d_{m-i}$ between said two adjacent spaced measuring points when said chain was new; said distance between adjacent measuring points on said chain being computed by said computing module according to the formula:

$$d_m = (S \cdot t_2) + d_f$$

where S is the speed at which said chain is moving, $t_2$ is the length of time said wear timer is on, and $d_f$ is the distance between said upstream and downstream sensors.

22. The method of claim 21 in which said initial distance $d_{m-i}$ between said two adjacent spaced measuring points when said chain was new is determined by passing said chain past said wear monitor when the chain is new.

23. The method of claim 20 in which wear is determined by comparing a wear distance $d_w$ travelled by said chain during the time $t_2$ during which said wear timer is on, to the wear distance for said chain when the chain was new.

24. The method of claim 23 in which said initial wear distance $d_w$ is determined by passing said chain past said wear monitor when the chain is new.

25. The method of claim 20 in which said wear monitor 20 is divided into two separate units: a sensor unit and a controller unit; said sensor unit comprising said upstream and downstream measuring sensors, coupled to a transmitter; said controller unit including said timers, said computing unit, and a signal receiver for receiving signals from said upstream and downstream measuring sensors and forwarding said signals to said timers.

26. The method of claim 25 in which said controller unit comprises a computer programmed to perform the functions of said timers and said computing module.

27. The chain wear monitor of claim 25 in which said transmitter assigns a unique frequency or frequency variation to each said measurement sensor, so said controller recognizes which sensor it is receiving a signal from.

28. The chain wear monitor of claim 25 in which said controller unit includes a counter, and said sensor unit also includes said marker sensor, said marker sensor being connected to said transmitter to transmit a signal from said marker sensor to said computing unit in said controller.

* * * * *

UNITED STATES PATENT AND TRADEMARK OFFICE
CERTIFICATE OF CORRECTION

PATENT NO. : 9,772,179 B2  
APPLICATION NO. : 14/326814  
DATED : September 26, 2017  
INVENTOR(S) : Charles C. Frost and James A. Mitchell It is certified that error appears in the above-identified patent and that said Letters Patent is hereby corrected as shown below:

In the Specification

Column 1, Line 28:
"timer" should be --sensor--

Column 2, Line 23:
"of" should be --off--

Column 3, Line 53:
"tar" should be --far--

Signed and Sealed this
Twenty-sixth Day of March, 2019

Andrei Iancu
*Director of the United States Patent and Trademark Office*